June 10, 1958

G. STIEGLER 2,837,761

HAMBURG STEAK PATTY FORMING DEVICE

Filed April 17, 1956

INVENTOR.
GEORGE STIEGLER

BY
Joseph A. Rave
Attorney

United States Patent Office 2,837,761
Patented June 10, 1958

2,837,761

HAMBURG STEAK PATTY FORMING DEVICE

George Stiegler, Cincinnati, Ohio

Application April 17, 1956, Serial No. 578,815

3 Claims. (Cl. 17—32)

This invention relates to improvements in a Hamburg steak patty forming device and particularly to such a device which is manually operated for producing Hamburg steak patties individually.

This application discloses improvements over the structure disclosed in pending application of George Stiegler for Hamburg Steak Patty Forming Device, Serial No. 398,013 filed December 14, 1953, now abandoned.

By the present invention Hamburg steak patties may be formed without the user in any manner handling the ground meat from which the patties are formed.

A device of the present invention admirably lends itself to the production of uniform Hamburg steak patties whether a large number of such patties are desired or but a few of them. The device of the present invention further adapts itself to adjustment whether patties of a thicker or thinner nature are desired, in other words, adapts itself to the control of the operator so that he may produce the desired number of patties from a given quantity of meat, such as a pound of ground meat. The present device further contemplates means whereby the freshly made patty may be readily removed from the forming device without the annoyance of sticking due to the inherent quality of the meat.

The principal object of the present invention is the provision of a Hamburg steak patty forming device that is simple of construction yet rapid in operation.

Another object of this invention is the provision of a Hamburg steak patty forming device that is always under the observation of the operator, whereby he is assured that each patty is identical and rapidly and expeditiously produced.

Another object of the present invention is the provision of a Hamburg steak patty forming device that is economical to produce and acquire and is extremely simple in operation.

A still further and specific object of the present invention is the provision of a Hamburg steak patty forming device that is readily adjustable as to its capacity wherefore Hamburg steak patties of different weights may be produced from the same device after a simple adjustment thereof.

A still further object of the present invention is the provision of a Hamburg steak patty forming device which readily separates the patty from its forming member due to the non-affinity of the patty for its former and which former is therefore maintained in a clear condition for subsequent use.

Other objects and advantages of the present invention will be readily apparent by reference to the following specification considered in conjunction with the accompanying drawings forming a part thereof, and it is to be understood that any modifications may be made in the exact structural details there shown and described, within the scope of the appended claims, without departing from or exceeding the spirit of the invention.

In the drawings.

Throughout the several views of the drawings, similar reference characters are employed to denote the same or similar parts.

Figure 1:
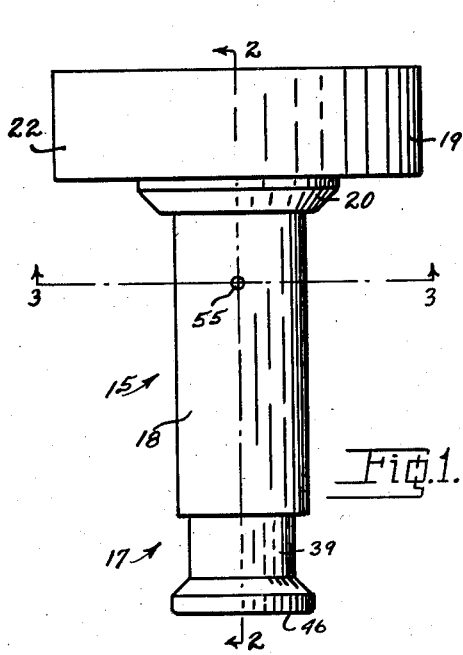
Fig. 1 is a side elevational view of the Hamburg steak patty forming device of the present invention.

The device or mechanism of the present invention is for manual operation as distinguished from prior devices which were power operated through a motor or the like.

The Hamburg steak patty forming device of the present invention, in general, comprises a forming device 15, an ejector element 16, and the ejector element operating mechanism 17.

Specifically, the patty forming device 15 comprises a casting that includes a sleeve-like body member 18 terminating at its upper end in a cylindrical cup-like receiver 19 with a thickened or enlarged collar portion 20, for a purpose subsequently to be made clear, between said sleeve-like body portion 18 and cup forming member 19.

Figure 2:
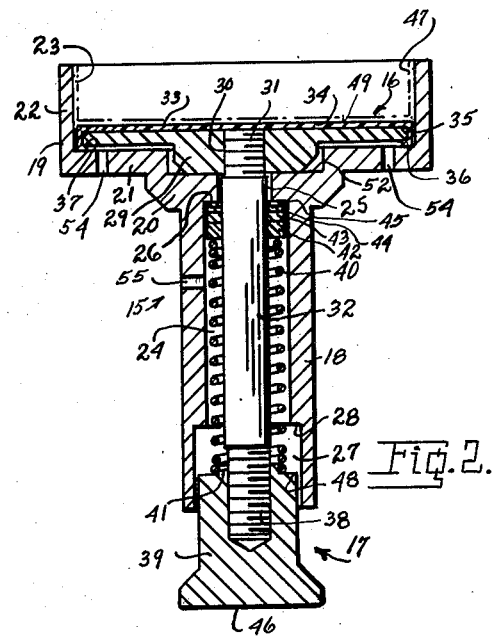
Fig. 2 is a vertical sectional view through the device of Fig. 1 as seen from line 2—2 on said Fig. 1.

As seen in Fig. 2, the cup-like patty forming member 19 has a base 21 from the periphery of which upstands or rises a wall 22 to provide a cup-like interior 23 for the said patty forming member 19. The sleeve-like or handle portion 18 of the device is hollow, as at 24, for the greater portion of its length terminating in a reduced bore or bearing 25, which communicates with the interior 23 of the cup-like patty forming member 19. The bore 25 constitutes and forms a bearing for the ejector operating means 17 as will presently be made clear. The hollow interior 24 of the sleeve like handle 18 terminates in a flat seat 26 and from which the reduced bore or bearing 25 extends into the interior of the cup-like patty forming member 19. The sleeve-like handle member 18 at its lower end is counter-bored as at 27 to provide a shoulder 28 at the base of the counter-bore and upwardly of the said lower end of the said handle member 18.

The ejector element 16 is circular in plan and of a diameter somewhat less than and disposed within the interior 23 of the patty forming cup 19 and forms or provides a support for the patty while being made or formed. Centrally, the ejector 16 is thickened to provide, in effect, a collar 29 which is provided substantially at its axial center with a threaded aperture 30 receiving the threaded end 31 of a shaft or rod 32 of the ejector mechanism 17.

The ejector element or plate 16 is formed to a diameter to have mounted thereon a cover 33 which comprises a body portion 34 of an area substantially equal to the area of the ejector member 16 and said cover has depending from the periphery of its body portion 34 a skirt 35 to enclose and encircle the circumferential edge of said element or plate 16. The cover 33 is of a diameter to freely slide within the patty forming cup 22 and engages the interior 23 of said cup with sufficient closeness to prevent ground meat from getting therebetween.

In order to retain the cover 33 on the element or plate 16 the free end of its skirt 35 is provided with a thickened rim providing an inwardly projecting flange 36. The flange 36 is provided with a face to engage a chamfer 37 on the periphery of said plate or element 16.

The said cover 33 is formed of one of the plastic resins, preferably, polyethylene which is flexible to the point to permit the insertion of the ejector element or plate 16 within its depending skirt 35 and inwardly of the projecting flange 36.

The shaft or rod 32 of the ejector mechanism extends through the bore or bearing 25 and the hollow interior 24 of the sleeve-like handle or body portion 18 to a point somewhat beyond the said body portion where it is reduced to form the threaded portion 38. Threaded on the said threaded portion 38 is a knob, preferably a stand, as will later be made clear, 39 through which the ejector mechanism is actuated. Surrounding the shaft or rod 32 is a compression spring 40 which has one end abutting the inner end of the stand 39, preferably, surrounding an integral projection 41 extending from the said stand or knob 39. The other end of the compression spring 40 is in abutment with the uppermost of a plurality of washers or spacers 42 disposed on the base 26 of the hollow interior or bore 24 in the body or handle member 18.

As noted above there is disposed around the shaft or rod 32 on the base 26 of the body member or handle hollow interior a plurality of washers, collars or spacer members 42, 43, 44 and 45. The spacer members or collars 42, 43, 44 and 45 are normally retained on the seat 26 of the handle member bore 24 by the spring 40 until it is desired to use one or more of them as will presently be made clear.

In practice the Hamburg steak patty forming device is positioned on the flat lower surface 46 of the knob or stand 39 on a suitable support, such as a table, and ground meat is forced into the cup 19 through the use of a suitable mechanism such as a spoon, a flat bladed knife, a hand spatula, or the like. The interior 23 of the cup 19 is filled between the upper surface 49 of the ejector element cover 33 and the upper edge or rim of the cup wall 22. In other words the interior 23, as illustrated in Fig. 2, is completely filled with ground meat and any excessive meat scraped off so as to be level with the outer edge or rim of the wall 22.

If desired, a suitable piece of paper, wax paper, for example, illustrated in dotted lines at 47 in Fig. 2, may be used to line the cup 19 and cover the ejector element prior to the placing therein of the ground meat. After the said cup 19 has been filled, the handle 18 is grasped and the same is actuated toward the table or other support on which the device is resting. This operation compresses the spring 40 and causes the ejector to retain the patty in its normal position while the cup is lowered below the same, or ejects the formed Hamburg steak patty from the cup.

In the event the cup 19 is lined with a liner or wax paper 47 the patty may be readily removed by grasping an edge thereof whereupon the patty may be placed on a table, frying plate, grill or the like, while a subsequent patty is being formed. It should be noted that the parts are so designed that the patty is completely above the cup 19 when the upper surface 48 of the knob or stand 39 engages with the shoulder 28 at the bottom of the counterbore 27. At this time the ejector mechanism has its outer surface, specifically, the upper face 49 of the ejector plate cover 33, slightly beyond the rim or upper edge of the cup wall 22, and the said ejector mechanism cover upper surface 49 is in the dot and dash line position 50 of Fig. 4. The nature of the ejector plate cover, namely, polyethylene, is such that sticking of the ground meat thereto is reduced to a minimum wherefore the ground meat patty can be readily removed without breaking or deforming the same and in any event through the use of a flat bladed knife, or hand spatula, which is passed beneath the patty and the upper surface 49 of the ejecting mechanism.

Figure 5:
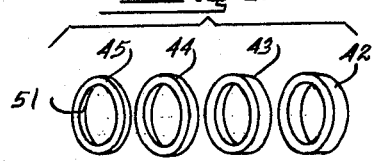
Fig. 5 is a perspective view of the means through which the Hamburg steak patty forming device may be adjusted between the illustrations in Figs. 2 and 4 as well as other and further adjustments.

As noted above, there is provided a plurality of spacer, collars, or washers 42, 43, 44 and 45 which constitute the positioning means for the ejector mechanism within the cup 19 whereby the capacity of the said cup may be varied. The said spacer collars are illustrated in Fig. 5 and as will be noted are relatively flat discs each centrally bored as at 51 to a diameter which will receive the shaft or rod 32. It will further be noted that the said spacer collars are of different widths or thickness to, as noted above, vary the capacity of the cup 19 whereby different weights of hamburg steak patties may be provided.

In use, the said spacer members, collars or washers 42, 43, 44 and 45 are removed from the interior of the handle member and placed between the collar portion 29 and the base 52 of a counterbore in the cup bottom or body portion 21 for thereby limiting the inward positioning of the ejector member, which thereby varies the capacity of the interior 23 of the cup 19. As illustrated in full lines in Fig. 4 the spacer member or collar 44 has been removed from the interior of the handle member and placed in operative position between the ejector member and cup base.

Figure 4:
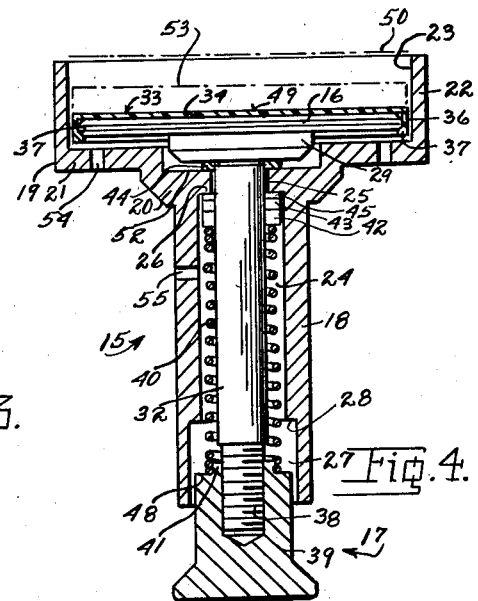
Fig. 4 is a view similar to Fig. 2 showing the device in an adjusted position as respects the disclosure in said Fig. 2.

By way of example, and not as a limiting factor in this application, the device as illustrated in solid lines in Fig. 4 may be said to have the capacity to form four ground meat patties of uniform diameter and thickness from a pound of ground meat. The substitution of the disc or spacing collar 45 for the spacing collar 44 shown in Fig. 4 would result in the capacity of the device being changed to permit the formation or production of three and one-half patties from the said pound of ground meat. The use of two spacer members, 42 and 45, for example, will decrease the capacity of the cup whereby five patties are provided, while with use of the two spacer members 42 and 43, the capacity is further decreased to the point where there is provided six patties from the said pound of ground meat. The use of three of said spacer members, members 42, 43 and 44, for example, will produce seven patties to the pound of ground meat.

It will be understood that additional spacer members may be provided for further reducing the size of the Hamburg steak patty or, alternately, the spacer members may be reduced in thickness so that with the use of any one of said spacer members the quantity of ground meat per patty will be otherwise changed than that above set forth. The capacity of the cup is changed because the spring 40 of the ejector mechanism 17 will retract the ejector member or plate to the point where the uppermost spacer member is in contact with the lower face of the ejector plate collar 29. The minimum capacity of the cup 19 is illustrated in Fig. 4 by phantom lines 53 for the upper edge of the ejector member cover when all of the spacer collars 42, 43, 44 and 45 are employed.

It should be noted, however, that regardless of the position of any or all of said spacers, collars, or washers 42, 43, 44 and 45, whether in the position of Fig. 2, or in the position of Fig. 4, or in any combination of said spacers, collars, or washers, whether on the shoulder 26 within the sleeve-like body member 18 or beneath the supporting plate 16, the tension in the spring 40 remains the same for holding the said supporting plate 16 in its operative position.

In view of the foregoing, it will be noted that the device is capable, through an extremely simple mechanism, of having its capacity readily changed or varied for correspondingly changing or varying the weight of, or quantity of, ground meat in a given Hamburg steak patty.

It is to be understood, of course, that the above suggested number of patties depends on the initial capacity of the cup 19 and the thickness of the spacer members with respect thereto.

Figure 3:
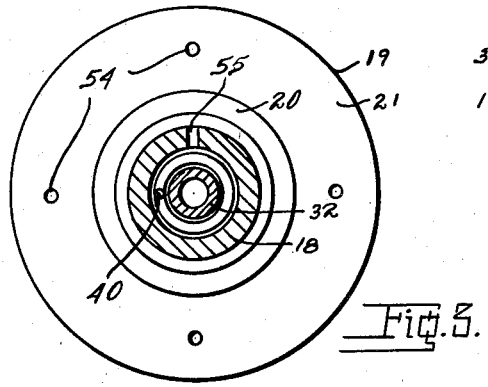
Fig. 3 is a horizontal sectional view through the device of Fig. 1 as seen from line 3—3 on said Fig. 1.

In order to prevent any air-bind in the device, that is, failure of operation of the ejector member, the cup base 21 is provided with one or more vents 54, there being illustrated in Fig. 3, four such vents, and the handle or cylindrical body member 18 is likewise vented as at 55.

What is claimed is:

1. In a Hamburg patty forming device the combination of a stand having a substantially flat supporting surface, a rod carried by and upstanding from said stand, a Hamburg steak patty support including a relatively thin flat plate at the upper end of the rod, a patty former comprising a base having an upper surface of an area substantially equal to the area of the patty supporting plate, said patty former base having a wall upstanding from its periphery to a point above the patty support, a hollow body member depending from the patty former base encircling the rod and having an internal shoulder at its upper end, a given number of removable individual collars within said hollow body member superimposed on one another on said hollow body member internal shoulder, yielding means between the stand and collars within said hollow body member under sufficient tension for yieldably maintaining the patty supporting plate in operative position against the upper surface of the patty former base and thereby establish the capacity of the patty former but which yielding means permits the patty former to be moved toward the stand for exposing the patty support above said patty former wall, and said individual collars being adapted to be removed selectively and in toto from within the hollow body member and disposed between the patty supporting plate and the upper surface of the base of the patty former for changing the capacity of the patty former without changing the tension in the yielding means for maintaining the patty support in operative position within the patty former.

2. In a Hamburg patty forming device the combination of a stand having a substantially flat supporting surface, a rod carried by and upstanding from said stand, a Hamburg steak patty support including a relatively thin flat plate at the upper end of the rod, a patty former comprising a base having an upper surface of an area substantially equal to the area of the patty supporting plate, said patty former base having a wall upstanding from its periphery to a point above the patty support, a hollow body member depending from the patty former base encircling the rod and having an internal shoulder at its upper end, a given number of removable individual collars within said hollow body member superimposed on one another on said hollow body member internal shoulder, yielding means between the stand and collars within said hollow body member under sufficient tension for yieldably maintaining the patty supporting plate in operative position against the upper surface of the patty former base and thereby establish the capacity of the patty former but which yielding means permits the patty former to be moved toward the stand for exposing the patty support above said patty former wall, and said individual collars being each of a different thickness and adapted to be removed selectively and in toto from within the hollow body member and disposed between the patty supporting plate and the upper surface of the base of the patty former for changing the capacity of the patty former without changing the tension in the yielding means for maintaining the patty support in operative position within the patty former.

3. In a Hamburg patty forming device the combination of a stand having a substantially flat supporting surface, a rod carried by and upstanding from said stand, a Hamburg steak patty support including a relatively thin flat plate at the upper end of the rod, said plate having its peripheral edge chamfered, a relatively flexible cover formed of polyethylene comprising a covering portion of an area substantially equal to the area of the supporting plate, a peripheral depending flange embracing the peripheral edge of said supporting plate, and a thickened rim at the free edge of said flange underlying the plate to engage the chamfer thereof for removably securing the cover and supporting plate to one another, a patty former comprising a base having an upper surface of an area substantially equal to the area of the patty supporting plate, said patty former base having a wall upstanding from its periphery to a point above the upper surface of the patty support, a hollow body member depending from the patty former base encircling the rod and having an internal shoulder at its upper end, a given number of removable individual collars within said hollow body member superimposed on one another on said hollow body member internal shoulder, yielding means between the stand and collars within said hollow body member under sufficient tension for yieldably maintaining the patty supporting plate in operative position against the upper surface of the patty former base and thereby establish the capacity of the patty former but which yielding means permits the patty former to be moved toward the stand for exposing the patty support above said patty former wall, and said individual collars being adapted to be removed selectively and in toto from within the hollow body member and disposed between the patty supporting plate and the upper surface of the base of the patty former for changing the capacity of the patty former without changing the tension in the yielding means for maintaining the patty support in operative position within the patty former.

References Cited in the file of this patent

UNITED STATES PATENTS

| | | |
|---|---|---|
| 1,892,779 | Cole | Jan. 3, 1933 |
| 2,008,725 | Parker | July 23, 1935 |
| 2,219,889 | Federighi et al. | Oct. 29, 1940 |
| 2,228,644 | Sackas | Jan. 14, 1941 |